Jan. 6, 1925.

S. E. FINLEY 1,522,431

APPARATUS FOR PREPARING BITUMINOUS CEMENT AGGREGATE COMPOSITION

Original Filed July 18, 1922   2 Sheets-Sheet 1

Inventor
Sam E. Finley
By O'Neill & Bunn
Attorneys

Jan. 6, 1925. 1,522,431
S. E. FINLEY
APPARATUS FOR PREPARING BITUMINOUS CEMENT AGGREGATE COMPOSITION
Original Filed July 18, 1922 2 Sheets-Sheet 2

Patented Jan. 6, 1925.

UNITED STATES PATENT OFFICE.

SAM EVERETT FINLEY, OF ATLANTA, GEORGIA.

APPARATUS FOR PREPARING BITUMINOUS CEMENT-AGGREGATE COMPOSITION.

Original application filed July 18, 1922, Serial No. 575,864. Divided and this application filed May 17, 1923. Serial No. 639,705.

*To all whom it may concern:*

Be it known that I, SAM E. FINLEY, a citizen of the United States, residing in the city of Atlanta, county of Fulton, State of Georgia, have invented certain new and useful Improvements in Apparatus for Preparing Bituminous Cement-Aggregate Composition; and I do hereby declare the following to be a full, clear, and exact description of the invention, such as will enable others skilled in the art to which it appertains to make and use the same.

The invention of the instant application, which is a division of an application filed July 8, 1922, Serial No. 575,864, relates to a novel form of apparatus for preparing bituminous cement-aggregate composition for surfacing walks, roadways, streets, roofs, floors, and the like, and has for its object the effecting of a mixture of aggregates such as stone, pebbles, gravel, slag, shell, sand, clay dust, or other inert material, either singly or in combination with bituminous cementitious or binding media, in suitable proportions, in such manner as to insure a uniform distribution of the various sized elements of the aggregate throughout the mass, and a thorough surface coating and corporeal impregnation or penetration of the individual elements of the aggregate with the bituminous material; whereby the uniformly distributed aggregate will be firmly and uniformly bonded in the fabricated surface layer or coating, and the individual elements of the aggregate will be materially strengthened and reinforced by the impregnating binder, so that a highly durable, wear resisting, moisture and weatherproof surface will result when the composition is applied to its intended use. To these ends the invention includes means for effecting the several operations of intimately and uniformly admixing and distributing the aggregate, of whatever character and varying sizes selected, by agitating and cascading the aggregate in a suitable receptacle, which effects the desired uniform distribution of the aggregate, spraying a properly regulated proportion of the selected bituminous binding medium onto the agitated and cascading mass of aggregate, preferably while both the aggregate and the binding medium are in heated condition, and finally applying a gaseous medium under pressure to the contents of the receptacle to cause the binding medium to penetrate the elements of the aggregate well below the surfaces thereof, to thoroughly coat the exposed surfaces and serve to bind the uniformly distributed elements of the aggregate together when the composite mass is applied as a surface coating of any of the various types indicated, and more particularly as a surfacing for roadways, walks, and the like, that are subject to severe traffic conditions.

A simple and effective form of apparatus for carrying out the method aforesaid is illustrated in the accompanying drawings, in which, Fig. 1 is a sectional plan view;

Figure 1:
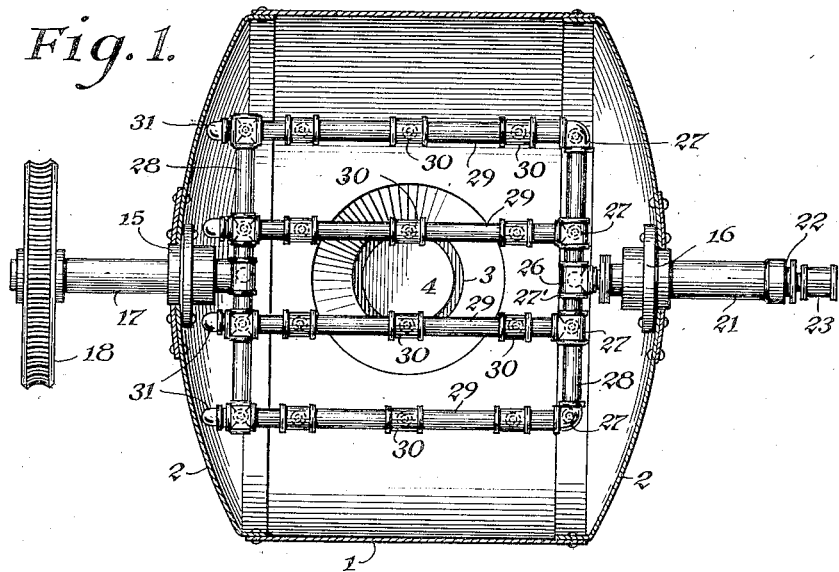
Figure 2:
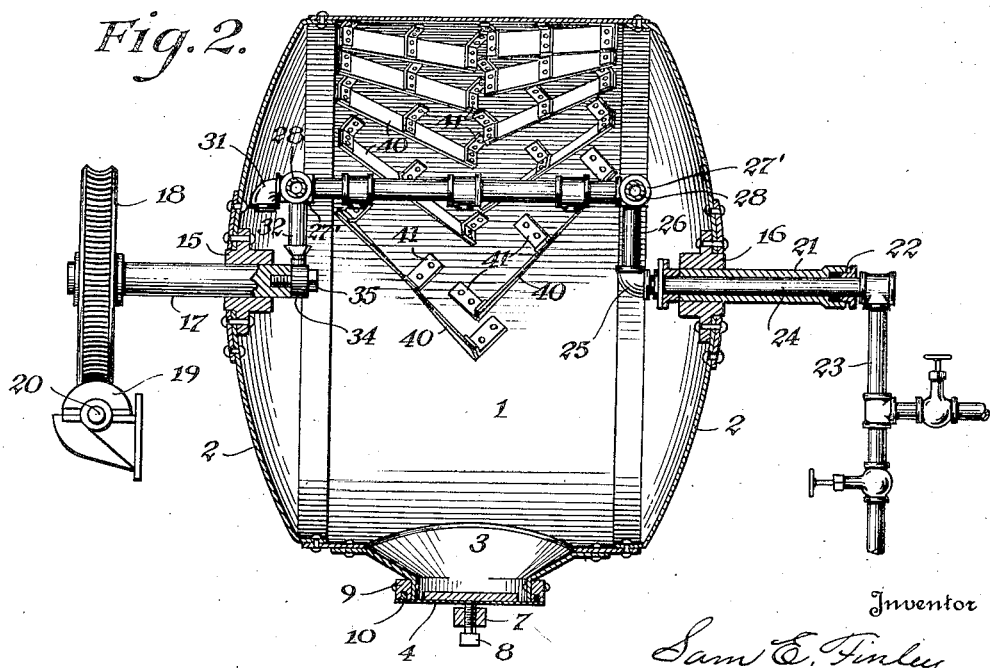
Fig. 2 is a sectional longitudinal elevation.
Figure 3:
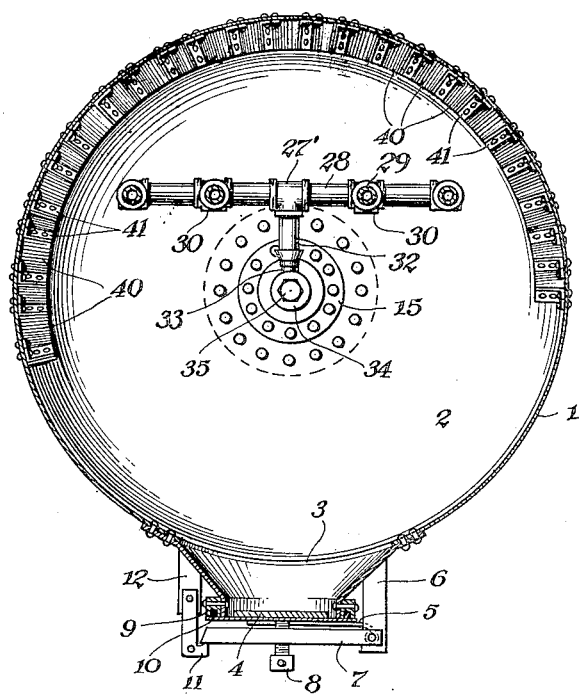
Fig. 3 is a sectional end elevation.

In the preparation and application of bituminous cement-aggregate mixtures, comprising aggregate of various types and varying sizes associated with asphalt or similar bituminous binding media for use in surfacing roadways, walks, and the like, it has been customary to carefully select the aggregate, such as broken stone, sand and gravel, for the purpose of utilizing only the tougher, wear resisting and thoroughly cleansed elements, varying from relatively large pieces of stone or gravel down to the finest sharp sand, adding thereto in liquid form the bituminous binding medium in heated condition, and then mechanically manipulating the mass in an endeavor to obtain an intimate admixture of the aggregate and binding medium. It has been the usual practice to effect such admixture in pug-mills, but, even under the most favorable conditions, it has been impossible to realize the desired result by this or any other type of apparatus for mechanical mixing, because the mixing operation, as practiced, results in the superficial coating of only the coarser materials, while the finer elements of the aggregate will roll up or collect in balls, with the result that the individual particles are not completely coated, and an effective union of the entire mass of aggregate with the bituminous binder cannot be obtained, and the resulting composition is weakened in proportion to the extent of the uncoated surfaces of the aggregate, and also to the extent of the loosely adherent masses or balls of the finer material of the aggregate distributed irregularly throughout the mixture. In other words, under the prevailing modes of preparing mixtures or compositions of this general character, it is practically impossible to obtain a uniform distribution of the various sizes of the aggregate, or even a complete superficial coating of all of the elements of the aggregate with the binding medium, and it therefore follows that the mixture when applied to its intended use is lacking in a satisfactory mechanical bond which would be effected by a uniform distribution of the various sizes of the aggregate, and is also materially deficient in the binding effect which would be produced by even a thorough superficial coating of all of the elements of the aggregate with the binding medium.

If the aggregate contains clay or earthy material, the difficulty aforesaid is aggravated, in that the clay or other foreign material will adhere to the surfaces of the aggregate, and prevent access of the binding medium thereto. Again, it has been found that if washed gravel, that is to say, gravel which has been freed from clay and other earthy materials, is employed as the aggregate, either alone or in admixture with sand, the surfaces are either too smooth to admit of a proper union with the bituminous cement, or are so irregular that in the mechanical mixing operation all of the surfaces or faces will not receive the coating of the binding medium. If the gravel or other aggregate contained a percentage of clay or soil, it was also found to be impossible to obtain a perfect admixture, and an intimate coating with a stable bituminous binder, as employed, for the reason that it is always essential, regardless of what type of pavement or kind of aggregate is contemplated, that the aggregate be heated to a temperature of from 250 to 400 degrees Fahrenheit, and at either of these temperatures, the natural tendency of the clay or soil is to bake or harden on the aggregate, so that the subsequent application of the binding medium would effect only a coating of the superficial layer of clay or soil, and would not, by any possibility, reach the underlying surface of the coarser aggregate. It has also been found that, when relatively finely divided aggregate, such as sand and clay in powdered form, has been employed as a part of the component aggregate, in the process of preliminarily drying these elements, it is practically impossible to completely separate the elements, but the latter are discharged from the drier containing many small balls or adherent masses of the individual particles, which have not sufficient inherent strength to resist the stresses of traffic, and, inasmuch as they can only be superficially coated with the binding medium, they will quickly break down and disintegrate when applied as a component part of the roadway structure.

It has been the common practice in preparing many bitumen-aggregate compositions, in which varying sizes of broken stone, gravel, slag, and varying grades of sand, are employed, to require a certain amount of finely divided material in powdered form, and, in some cases, pulverized clay, on the theory that these finely divided elements will be distributed throughout the mass of the aggregate and effect a mechanical bond between the larger elements of the aggregate, but however effective this may appear in theory, it has been impossible of practical realization because of the tendency of the fine matter to bake or harden under the influence of heat in the drying operation, or "set up" in contact with moisture, thereby preventing a complete superficial coating of all of the particles with the bituminous binder. These unbonded masses of fine material also absorb moisture when applied to the road surface, with a resultant quick disintegration of the surface wherever these uncoated and practically unbonded masses of fine material occur.

According to the present method, no matter how clean or hard the aggregate may be, and no matter what the condition of the clay, dust, sand or other fine material, be in, all of the foregoing objections are successfully overcome for the reason that the bituminous binding medium, under the conditions of application, is driven into and through the finely divided matter to effect a thorough mixture, intimate contact and coating of every particle, from the finest to the coarsest, and is also caused to penetrate below the surfaces and into the bodies of the coarser aggregate particles, and to completely envelop the latter, so that all of the solid material is not only completely superficially coated, but is actually impregnated with the binding medium, and an intimate bonding of the solid elements thereby effected, when the aggregate is applied to the road surface. For example, with the hardest types of flint gravel and a highly stable asphaltic cement of from 40 to 45 penetration, it has been found that the binding medium has been caused to penetrate or impregnate the elements of the gravel to as great a depth as three-eighths of an inch, and also to completely superficially coat each and every element of the gravel.

It is also highly important that only the proper proportions of aggregate, with or without the fine filling material, and bituminous binding medium, be employed, and that a uniform distribution of the aggregate and the binding medium be effected, if the best results are to be obtained. This will readily be appreciated when attention is called to the fact that if ten per cent. of bituminous cement for any given mixture is sufficient to make a well-balanced pavement, any increase over this percentage will cause the pavement, under the impact of traffic and the effect of heat, to shove or roll, and a lesser percentage will cause that portion of the mass in which the deficit occurs to break up under the impact of traffic and to crack and slough off under low temperatures.

The practice of the present invention renders it possible, for the first time, to obtain uniformity of distribution of the various sizes of the mineral aggregate, and a thorough bonding of the latter, not only by reason of the complete superficial coating of every element of the aggregate, but also the penetration of the larger elements by the binding medium, which not only materially adds to the strength of the composite mass and decreases the tendency to disintegration thereof, but permits the use of various materials, which because of their structural weakness could not be utilized in bituminous cement-aggregate compositions produced under the former methods, as the penetration and setting of the binding medium within the pores and cavities of the normally weak aggregate, imparts thereto the necessary strength and capacity to resist wear and disintegration under traffic conditions.

Furthermore, the thorough impregnation or penetration of the binding medium into and below the surfaces of the aggregate elements, whether the latter be weak or strong, will have the further highly desirable effect of providing a reserve of active binding medium which is available for securely bonding or binding together the various parts of the aggregate elements should the latter actually break down or fracture under extraordinary traffic conditions. In other words, the impregnation of the aggregate provides sufficient bituminous cement to re-bond any aggregate that might be accidentally fractured after the composition has been laid, which results could not possibly be effected by the former method of merely surface coating the aggregate. As a rule, the weaker the aggregate, the more porous it is, and consequently the greater the percentage of impregnation thereof with the bituminous binding medium, and it therefore follows that even should such a character of aggregate be actually reduced to fine particles under traffic conditions, there would be sufficient of the impregnating binding medium to effectively bond the broken or disintegrated aggregate and unite the same into a firm, coherent element of the surface coating.

As illustrated, the apparatus illustrated in the drawings has been found most effective in producing a highly efficient bituminous cement-aggregate mixture, irrespective of the character, size and condition of the aggregate employed, so that when the composition is applied to a road surface the latter will be found to possess the desirable qualities of resiliency, imperviousness to moisture, and durability under most trying traffic conditions, and will evidence no tendency to shove or roll under load or high temperature, and will not crack, disintegrate or slough off when subjected to extremely low temperatures.

Referring to the drawings, which exemplify the preferred form of apparatus for carrying out the mixing of the composition, 1 indicates a generally cylindrical drum or barrel made of sheet steel or the like having convex heads 2, 2, secured thereto, the receptacle being provided with an opening at one side of the cylindrical section surrounded by a neck portion 3, with which co-operates a door or closure 4 having a hinge 5 connected to a supporting bracket 6, the door 4 engaging a reinforcing rim 9 having a packing ring 10 embedded therein. The door or closure 4 is retained in fluid-tight contact with the rim by means of a latch member 7 engaging a keeper 11 pivotally attached to a bracket 12 secured to the wall of the neck 3, said latch carrying a set screw 8.

Secured centrally in the heads 2, 2, are thimbles 15 and 16, in which are rigidly secured shafts or journals 17 and 21 respectively, which are mounted in suitable bearings, not shown, and upon which the receptacle rotates. Rotary motion is imparted to the receptacle by any suitable gearing such as a worm-wheel 18, fast on shaft 17, which meshes with a worm 19 carried by a cross-shaft 20, which receives its power from any suitable source. The shaft or journal 21 is hollow to receive the inlet pipe for supplying the binding medium and also the air or other gaseous medium under pressure to the interior of the receptacle, the said shaft being provided with a suitable gland or stuffing box 22 at its outer end to prevent the escape of the gaseous pressure between the hollow shaft and the inlet pipe.

The inlet or supply pipe 24 is connected at its outer end by a suitable coupling with a pipe line 23, which in turn is in communication with the supply of heated bituminous binding material and with the supply of air under pressure, these elements being controlled by appropriate valve mechanisms, as will be understood. The inner end of the supply pipe 24 is connected by an elbow 25 with a vertical pipe 26, which constitutes one supporting element for a spray header extending longitudinally and transversely of the interior of the drum or receptacle and above the axis of rotation thereof, said header comprising longitudinal pipe sections 28 coupled together by unions 27 having discharge nozzles on their lower faces, and transverse pipe sections 29 coupled together by similar nozzled couplings 30. Preferably, the ends of the transverse pipes 29 are also provided with elbow nozzles 31. The opposite end of the multiple section header is supported by a short rod section 32 engaging a coupling 27′ in the corresponding header pipe 28, at its upper end, and a reducing nipple 33 at its lower end, which nipple is provided with a bearing ring or collar 34 mounted on the inner end of the shaft 17 and secured to the latter by a suitable screw-bolt 35, so that said shaft may freely rotate without imparting any movement to the collar 34 and the spray header supported thereby.

In order to lift and agitate the mineral aggregate and cause the latter to fall or cascade in the receptacle, one-half of the inner surface of the drum-like section 1 opposite the opening therein is provided with a series of angularly disposed blades 40 secured to the wall of the drum by brackets 41, the blades being preferably arranged in pairs disposed at approximately right angles to each other, and at approximate angles of 45 degrees to the axis of rotation of the receptacle.

In carrying out the invention, the aggregate of appropriate sizes and character is preferably heated to a temperature of from 300 to 350 degrees Fahrenheit, for the purpose of driving off the moisture, and, what is more important in this particular case, to cause the aggregate to expand and the pores thereof to open, and to rarefy the air within the pores of the aggregate. The properly heated aggregate in appropriate quantity is then placed in the rotary drum or receptacle through the opening in the side thereof, and the cover 4 tightly closed. The receptacle is then rotated by means of the driving gear 18, 19, for a sufficient time to cause a thorough and uniform admixing of the various elements and sizes of the aggregate, after which the supply of bituminous binding medium, in accurately regulated quantity, is delivered from the pipe line 23, inlet pipe 24, and the spray header connected therewith. The binder, which is preferably heated to a slightly higher degree than the aggregate, is delivered from the various nozzles 27 and 30 onto the body of the aggregate which is being tumbled and cascaded from the top toward the bottom of the receptacle by the action of the blades 40, said blades, because of their particular construction and arrangement, serving to lift the aggregate as the receptacle turns over, and cause the aggregate to fall or cascade in separated units toward the lower part of the receptacle, so that the individual elements of the aggregate will pass through the descending sprays of hot binding medium discharged by the stationary header. The continuous agitation and dropping or cascading of the aggregate, both before and during the application of the bituminous binder, will produce an intimate admixture of the various sized elements of the aggregate, and prevent the latter collecting in strata or layers graded according to size, which is one of the salient objections to the former modes of mixing aggregate and a binding medium. As the individual elements of the aggregate are repeatedly lifted and dropped through the sprays of hot bitumen, all of the surfaces of each element of the aggregate are completely covered by the bitumen, as the tumbling and cascading of the mineral aggregate serve to effectively separate the various elements thereof, so that the entire surface of each element will be ultimately exposed to the bitumen sprays. When exactly the proper proportion of bituminous binder has been delivered to the receptacle to form a properly balanced batch of the composition, the supply of the binder is cut off and a supply of air or gas under pressure is admitted from pipe line 23, pipe 22, through the spray header, into the receptacle, the supply being continued until a gaseous pressure is produced within the receptacle sufficient to cause the binding medium covering the surface of the individual elements of the aggregate to be driven into the pores and openings of the aggregate and thereby effecting a thorough penetration and impregnation of the aggregate elements well below the surfaces thereof, the impregnation being materially enhanced by the heated and expanded condition of the aggregate, which produces a partial vacuum within the bodies of the aggregate elements, and the pressure of the gaseous medium, which forces the bitumen into the aggregate, so that the impregnating portions of the binding medium extending into the bodies of the aggregate elements constitute a continuous series of key-like elements locking the superficial coating of bitumen to the individual aggregate elements; therefore, when the mixing operation is completed and the composition is applied to the road surface, all of the elements of the aggregate, which are uniformly distributed throughout the mass irrespective of the sizes of the elements, will be united into a coherent, compact, homogeneous mass with the various elements of the aggregate actually interlocked with the interposed and enveloping bitumen, and, through the binding action of the latter, with one another, so that the resultant composition is substantially uniform throughout in strength, wear resisting qualities, imperviousness to moisture, and ability to withstand the varying changes of temperature due to the seasons, and the most exacting conditions of traffic.

After the given charge or batch of the mixture has been formed in the receptacle, as hereinbefore described, it is discharged by opening the door or closure 4, and the apparatus is ready to receive a new charge. As will be understood, the composite mixture as discharged from the mixing apparatus is conveyed, while still in heated condition, to the place of application, where it is spread upon the roadway, worked down to grade and rolled, thereby producing a highly superior road surface.

While the composition has been described as particularly well adapted to the surfacing of roadways, pavements and the like, it will be understood that it is not limited to these specific applications, but is equally effective in providing surface coating for floors, roofs, or other structures that are subject to stresses, traffic, loads, or varying conditions of weather and temperature which would require a stable, resistant, but more or less flexible and resilient covering.

In the event that the composition, after mixing, is to be shipped for considerable distances, it will be found of advantage to carry out the process with a low penetration bituminous cement, which is brought to a high state of fluidity by means of a "cut-back," or light oil, so that a complete coating and impregnation of the aggregate may be effected, and the composition may be shipped cold and even permitted to stand for a reasonable time without setting up, but when spread on the surface in a relatively thin layer, the volatile "cut-back" will be gradually dissipated, leaving the stable asphaltic cement to perform its normal function.

What I claim is:

1. Apparatus for preparing bituminous cement-aggregate compositions comprising a rotary receptacle, angularly disposed blades on the interior of the receptacle for agitating and cascading the contents of the receptacle therein, and means for spraying a bituminous binding medium throughout the mass and subsequently supplying gaseous pressure to the receptacle.

2. Apparatus for preparing bituminous cement-aggregate compositions comprising a rotary receptacle, angularly disposed blades on the interior of the receptacle for agitating and cascading the contents of the receptacle therein, a spray header having a pipe connection through the axis of rotation of the receptacle for first spraying the bituminous binding medium onto and throughout the agitated mass in the receptacle and subsequently admitting gaseous pressure to the receptacle.

In testimony whereof I affix my signature.

SAM EVERETT FINLEY.